(12) United States Patent
Ruckart (10) Patent No.: US 7,865,297 B2
(45) Date of Patent: Jan. 4, 2011

(54) METHODS FOR OBTAINING A NAVIGATION TRACK BETWEEN A FIRST AND A SECOND LOCATION BASED ON LOCATION INFORMATION SHARED BETWEEN PEER DEVICES AND RELATED DEVICES AND COMPUTER PROGRAM PRODUCTS

(75) Inventor: John Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 986 days.

(21) Appl. No.: 11/709,959

(22) Filed: Feb. 23, 2007

(65) Prior Publication Data

US 2008/0208444 A1   Aug. 28, 2008

(51) Int. Cl.
*G05D 1/00* (2006.01)
*G06F 7/00* (2006.01)

(52) U.S. Cl. .............. 701/201; 701/200; 701/206; 701/207; 701/211; 701/213

(58) Field of Classification Search ............ None
See application file for complete search history.

(56) References Cited

U.S. PATENT DOCUMENTS

2005/0049785 A1*   3/2005   Vergin .................... 701/209
2005/0075119 A1*   4/2005   Sheha et al. ............ 455/456.6

FOREIGN PATENT DOCUMENTS

WO   WO2005/014393 A2 *   2/2005

* cited by examiner

*Primary Examiner*—Khoi Tran
*Assistant Examiner*—Bhavesh V Amin
(74) *Attorney, Agent, or Firm*—Myers Bigel Sibley & Sajovec, P.A.

(57) ABSTRACT

A first device is operated to obtain a navigation track between a first location and a second location by establishing a peer-to-peer communication connection with a second device and receiving a message that contains information associated with the first location and/or the second location from the second device. The information is associated with a navigation module on the first device. The information associated with the at least one of the first location and the second location is processed using the navigation module to obtain the navigation track between the first location and the second location.

20 Claims, 8 Drawing Sheets

METHODS FOR OBTAINING A NAVIGATION TRACK BETWEEN A FIRST AND A SECOND LOCATION BASED ON LOCATION INFORMATION SHARED BETWEEN PEER DEVICES AND RELATED DEVICES AND COMPUTER PROGRAM PRODUCTS

BACKGROUND OF THE INVENTION

The present invention relates generally to communication networks and devices that operate thereon and, more particularly, to sharing location information between devices on a communication network.

When people communicate today through, for example, email, Instant Messaging (IM) programs, Short Message Service (SMS) messages, etc., the messages are often limited to simple text information and/or attachments containing text, graphic files, audio files, video files, and the like. When people plan to meet at a specific place, individuals typically try to describe the location or, if known, provide a street address or other type of identifying information, which the recipient may then provide as input to a mapping application, such as, for example, mapping applications provided Yahoo, Google, and Mapquest. Similarly, if a computer user is reviewing a Website of a business and decides he/she wants to visit the business, the user may obtain the address of the business from the Website and provide that address to a mapping application as described above. Alternatively, the business Website may provide a link to a map that contains directions to the business location when approaching from various locations. Thus, for a user to obtain more detailed information about a location, such as, for example, directions from a current location or reference information related to the location, the user may need to make use of a public mapping application or seek out the detailed information on a Website or other location information source. Services, such as evite-.com, may allow email invitations to be sent with a link to a map for a given address. The recipient may still need to print the map and directions or hand write the directions to make effective use of the map and/or directions, however.

SUMMARY

According to some embodiments of the present invention, a first device is operated to obtain a navigation track between a first location and a second location by establishing a peer-to-peer communication connection with a second device and receiving a message that contains information associated with the first location and/or the second location from the second device. The information is associated with a navigation module on the first device. The information associated with the at least one of the first location and the second location is processed using the navigation module to obtain the navigation track between the first location and the second location.

In other embodiments of the present invention, the navigation track is displayed.

In still other embodiments of the present invention, processing the information comprises accessing a navigation information repository on the first device to determine the navigation track between the first location and the second location.

In still other embodiments of the present invention, processing the information comprises accessing a remote navigation information repository via a communication connection therewith to determine the navigation track between the first location and the second location.

In still other embodiments of the present invention, the first location is a current location of the first device.

In still other embodiments of the present invention, the determined navigation track is updated responsive to changes in the current location of the first device.

In still other embodiments of the present invention, the first location is a current location of the second device and the second location is a current location of the first device.

In still other embodiments of the present invention, neither of the first location and second location is a current location of the first device.

In still other embodiments of the present invention, the information associated with the first location and/or the second location comprises Global Positioning System (GPS) information, cellular technology location information, an address, and/or a name.

In still other embodiments of the present invention, the GPS information is encoded in a GPS eXchange (GPX) format.

In still other embodiments of the present invention, the information associated with the first location and/or the second location comprises at least one waypoint between the first location and the second location, and the obtained navigation track between the first location and the second location includes the at least one waypoint.

In still other embodiments of the present invention, the message comprises a Short Message Service (SMS) text message, a hyperlink, an electronic mail, a directory listing, an advertisement, an Instant Message (IM), and/or a Voice over Internet Protocol (VoIP) call. The location information may be an attachment to the message and/or embedded in the message using at least one delimiter.

In still other embodiments of the present invention, the information is saved at the first device and the communication connection with the second device is ended before processing the information.

In further embodiments of the present invention, an electronic device comprises a navigation module that is configured to process information associated with the at least one of a first location and a second location to obtain a navigation track between the first location and the second location, and a communication module that is configured to establish a peer-to-peer communication connection with another electronic device and to receive a message that contains the information associated with at least one of the first location and the second location therefrom. The information is associated with the navigation module.

In still further embodiments of the present inventions the navigation module is further configured to access a navigation information repository on the electronic device to determine the navigation track between the first location and the second location.

In still further embodiments of the present invention, the navigation module and communication module are further configured to access a remote navigation information repository via a communication connection therewith to determine the navigation track between the first location and the second location.

In still further embodiments of the present invention, the information associated with the first location and/or the second location comprises Global Positioning System (GPS) information, cellular technology location information, an address, and/or a name.

In still further embodiments of the present invention, the information associated with the first location and/or the second location comprises at least one waypoint between the first location and the second location, and the obtained navigation track between the first location and the second location includes the at least one waypoint. The location information may be an attachment to the message and/or embedded in the message using at least one delimiter.

Although described primarily above with respect to method and device embodiments of the present invention, it will be understood that the present invention can be embodied as methods, devices, and/or computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

For purposes of illustration, some embodiments of the present invention are described herein in the context of a device being a mobile terminal. It will be understood, however, that the present invention is not limited to such embodiments and that a device may be embodied as any electronic device that is configured to process location information received, for example, from another device.

Some embodiments of the present invention stem from a realization that location information may be attached to and/or embedded in a message similar to the manner in which documents, files, hyperlinks, metadata, and packet headers are attached to and/or embedded in messages. The location information may be associated with a navigation module on the receiving device, which is used to process the location information to obtain a navigation path. Processing the location information could be automatic in that the navigation module automatically extracts and processes the location information contained in the message. In other embodiments, the location information may not be processed until a user of the client device performs an action to begin processing of the information.

Embodiments according to the invention can operate in a peer-to-peer communication environment. Devices that communicate via a peer-to-peer connection function as both a client and a server with respect to each other. Thus, peer devices essentially function as equals when communicating with each other.

Figure 1:
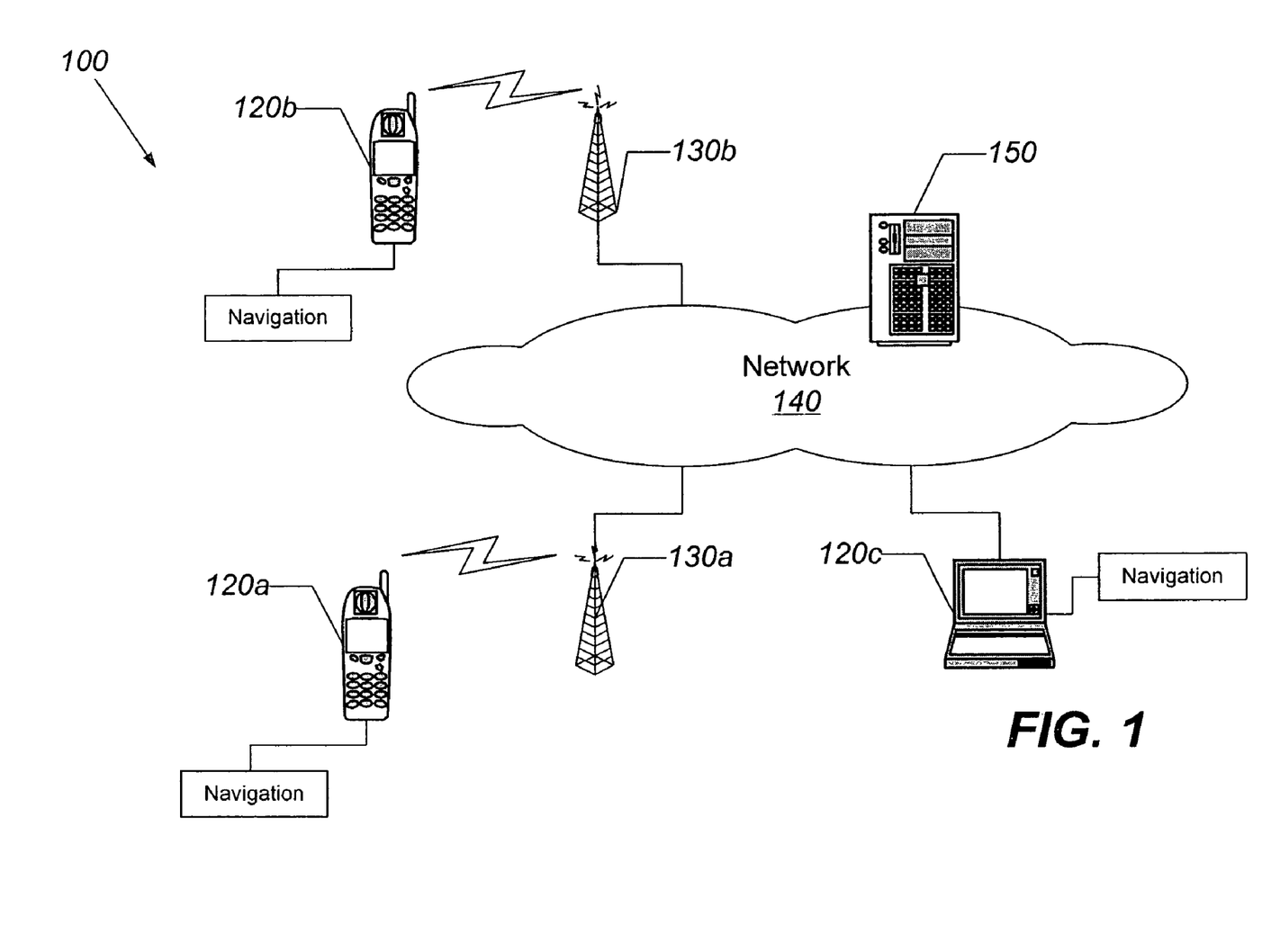
FIG. 1 is a block diagram that illustrates a communication network architecture to facilitate obtaining a navigation track based on location information shared between peer devices in accordance with some embodiments: of the present invention.

Referring now to FIG. 1, a communication network architecture 100 to facilitate obtaining a navigation track based on location information shared between peer devices, according to some embodiments of the present invention, includes electronic devices 120a, 120b, and 120c, and a navigation information repository server 150 that are connected via a network 140 as shown. The network 140 includes wireless base station transceivers 130a and 130b that may facilitate wireless communication with mobile terminals 120a and 120b. The navigation information repository server 150 may be accessed by other devices to obtain navigation information therefrom and/or to process navigation information to determine a navigation track. A navigation track is the actual path followed by or intended for a moving body. As will be discussed further herein, the electronic devices 120a, 120b, and 120c may obtain navigation tracks based on location information shared with each other a via peer-to-peer communication connections. For example, one of the electronic devices 120a, 120b, and 120c may transmit a message to another one of the electronic devices 120a, 120b, and 120c that contains location information attached thereto or embedded therein. The location information is associated with navigation modules on the client devices 120a, 120b, and/or 120c, which process the location information. The network 140 may represent a global network, such as the Internet, or other publicly accessible network. The network 140 may also, however, represent a wide area network, a local area network, an Intranet, or other private network, which may not accessible by the general public. Furthermore, the network 140 may represent a combination of public and private networks or a virtual private network (VPN). Moreover, devices 120a and 120b are described as mobile terminals for purposes of illustrating some embodiments of the present invention. It will be understood, however, that the present invention is not limited to such embodiments and that a device may be embodied as any electronic device that is configured to process location information received, for example, from another device via a peer-to-peer communication connection. Thus, according to various embodiments of the present invention, a device may be a mobile terminal such as devices 120a and 120b, or may be relatively stationary, such as device 120c.

Although FIG. 1 illustrates an exemplary communication network, it will be understood that the present invention is not limited to such configurations, but is intended to encompass any configuration capable of carrying out the operations described herein.

Figure 2:
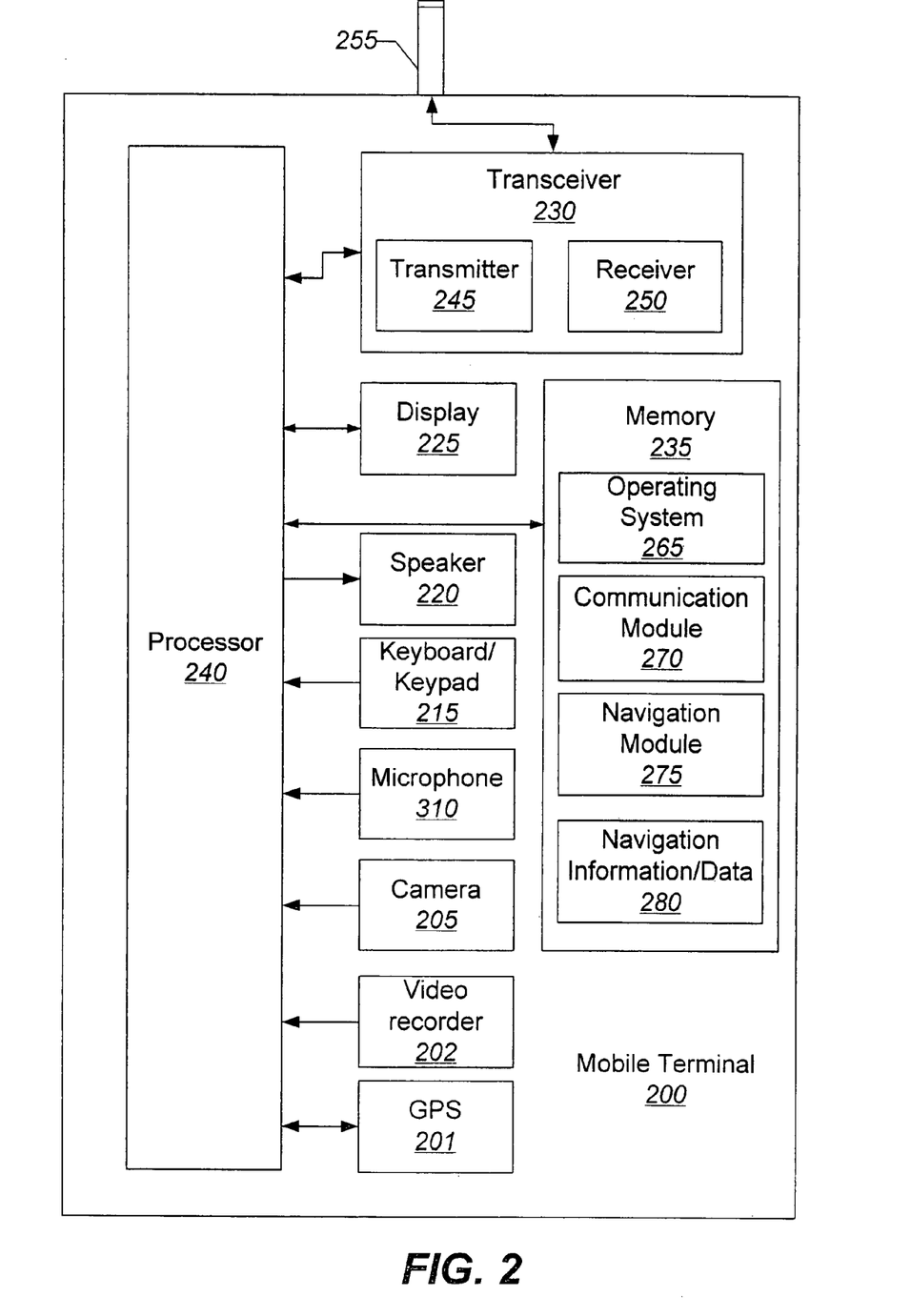
FIG. 2 is a block diagram that illustrates an electronic device/mobile terminal in accordance with some embodiments of the present invention.

Referring now to FIG. 2, an exemplary mobile terminal 200 that may be used to implement a device, such as devices 120a and 120b of FIG. 1, in accordance with some embodiments of the present invention, includes a Global Positioning System (GPS) module 201, a video recorder 202, a camera 205, a microphone 210, a keyboard/keypad 215, a speaker 220, a display 225, a transceiver 230, and a memory 235 that communicate with a processor 240. The transceiver 230 comprises a transmitter circuit 245 and a receiver circuit 250, which respectively transmit outgoing radio frequency signals to base station transceivers and receive incoming radio frequency signals from the base station transceivers via an antenna 255. The radio frequency signals transmitted between the mobile terminal 200 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 200 may be included in many conventional mobile terminals and their functionality is generally known to those skilled in the art.

The processor 240 communicates with the memory 235 via an address/data bus. The processor 240 may be, for example, a commercially available or custom microprocessor. The memory 235 is representative of the one or more memory devices containing the software and data used to operate the mobile terminal and to process location information received from, for example, a server device. The memory 235 may include, but is not limited to, the following types of devices: cache, ROM, PROM, EPROM, EEPROM, flash, SRAM, and DRAM.

As shown in FIG. 2, the memory 235 may contain four or more categories of software and/or data: the operating system 265, a communication module 270, a navigation module 275, and/or a navigation information/data module 280. The operating system 265 generally controls the operation of the mobile terminal 200. In particular, the operating system 265 may manage the mobile terminal's software and/or hardware resources and may coordinate execution of programs by the processor 240. The communication module 270 may be configured to manage the communication protocols that are used to allow the mobile terminal 200 communicate with other devices and systems. The navigation module 275 may be configured to process a message received, for example, from another device via a peer-to-peer communication connection and extract location information therefrom.

In accordance with various embodiments of the present invention, the location information may be attached to the message or may be embedded in the message using one or more delimiters. The navigation module 275 may use the received location information in conjunction with the navigation information/data module 280 to obtain a navigation track between two locations. The navigation information/data module 280 may, for example, include geographic information/data for a particular area, region, or even the world.

The navigation module 275 may also cooperate with the communication module 270 to access a remote navigation information repository, such as server 150 of FIG. 1. Similar to the navigation information/data module 280, the navigation information repository server 150 may include geographic information/data, which is communicated back to the requesting device. In some embodiments, the requesting device may send the location information extracted from the received message to the navigation information repository server 150, which processes the received location information and communicates a navigation track back to the requesting device.

In accordance with some embodiments of the present invention, the location information may identify one or more locations and may be associated with the navigation module 275 for processing. The location information may be included in a message such as a Short Message Service (SMS) text message, a hyperlink, an electronic mail, a directory listing, an advertisement, an Instant Message (IM), and/or a Voice over Internet Protocol (VoIP) call. The location information may be GPS information, an address, and/or a name in accordance with some embodiments of the present invention. The GPS information may be encoded, for example, in the GPS eXchange Format (GPX), which is an Extensible Markup Language (XML) standard for communicating GPS data between software applications. In other embodiments, the location information may include cellular/Wi-Fi technology location information. For example, cellular/Wi-Fi technology may be used to track the current position of a mobile terminal. The base stations in a wireless network that are used to transmit and receive the cellular/Wi-Fi communication signals may monitor the relative signal strength as a mobile terminal changes locations. An approximate location of a mobile terminal may be determined based on the signal strength received at multiple base stations.

Although FIG. 2 illustrates an exemplary software and hardware architecture that may be used to process location information received in a message at a client device it will be understood that the present invention is not limited to such a configuration, but is intended to encompass any configuration capable of carrying out the operations described herein.

Computer program code for carrying out operations of devices and/or systems discussed above with respect to FIGS. 1-2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written-in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to message flow, flowchart and/or block diagram illustrations of methods, devices, and/or computer program products in accordance with some embodiments of the invention. These message flow, flowchart and/or block diagrams further illustrate exemplary operations for processing location information received at a client device, from, for example, a server device in accordance with various embodiments of the present invention. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Operations for obtaining a navigation track based on location information shared between peer devices in accordance with some embodiments of the present invention, will now be described with reference to FIG. 3 and the network and device architectures of FIGS. 1 and 2, respectively. Operations begin at block 300 where, for example, a first device 120*a* establishes a peer-to-peer communication connection with a second device 120*b*. The first device 120*a* receives a message from the second device 120*b* that contains information associated with a first and/or a second location at block 310. The location information in the message is associated with a navigation module, such as navigation module 275, on the client device. As a result, at block 320, the navigation module 275 extracts the location information from the received message and processes the location information to obtain a navigation track between the first and the second location. In accordance with some embodiments of the present invention, one of first and second locations may be a current location of the device that received the message containing the location information. Moreover, as the current location of the device that received the message containing the location information changes, the navigation module 275 may update the navigation track based on the new location of the device. In other embodiments, neither of the first and second locations is a current location of the device that received the message containing the location information.

Figure 4:
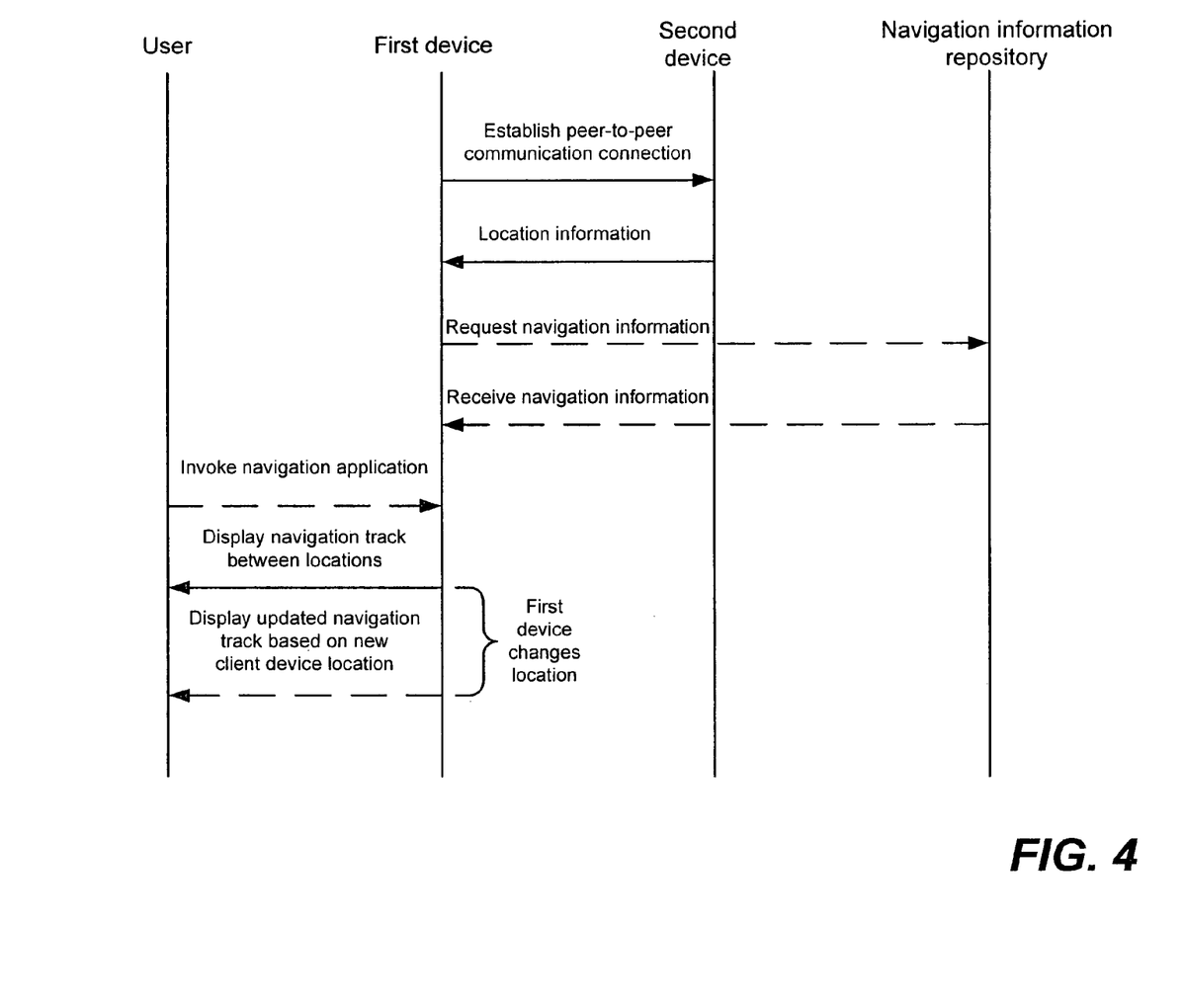
FIG. 4 is a message flow diagram that illustrates operations for obtaining a navigation track based on location information shared between peer devices in accordance with some embodiments of the present invention.

FIG. 4 is a message flow diagram that that illustrates operations for obtaining a navigation track based on location information shared between peer devices in accordance with some embodiments of the present invention. Referring to FIG. 4 and the network and device architectures of FIGS. 1 and 2, a user of a first device 120*a* causes the first device 120*a* to establish a peer-to-peer communication connection with a second device 120*b*, such as, for example, an IM connection. The first device 120*a* receives an IM message with an attachment that includes location information identifying the address of the user of the second device 120*b*. The address of the user of the second device 120*b* may be either attached to the IM or embedded therein and is detected by the navigation module 275 on the device 120*a*. In some embodiments, the device 120*a* may request navigation information from the navigation information repository server 150 to facilitate processing the location information received with the IM. Moreover, in accordance with various embodiments of the present invention, the user of the device 120*a* may invoke the navigation module 275 to process the stadium location information by, for example, clicking on an icon for the navigation module or an icon for the location information in the IM, or the navigation module 275 may process the location information received in the IM automatically. In some embodiments, the user of the client device 120a may elect to save the location information where it may be processed later even after the communication session with the second device 120b.

In the example shown in FIG. 4, the navigation module 275 may process the location information received in the IM, i.e., the address of the user of the second device 120b and display a navigation track between a current location of the device 120a and the address of the user of the second device 120b. Because the device 120a is a mobile terminal, the navigation module 275 may update the navigation track between the current location of the mobile terminal 120a and the address of the user of the second device 120b as mobile terminal 120a changes location.

Figure 3:
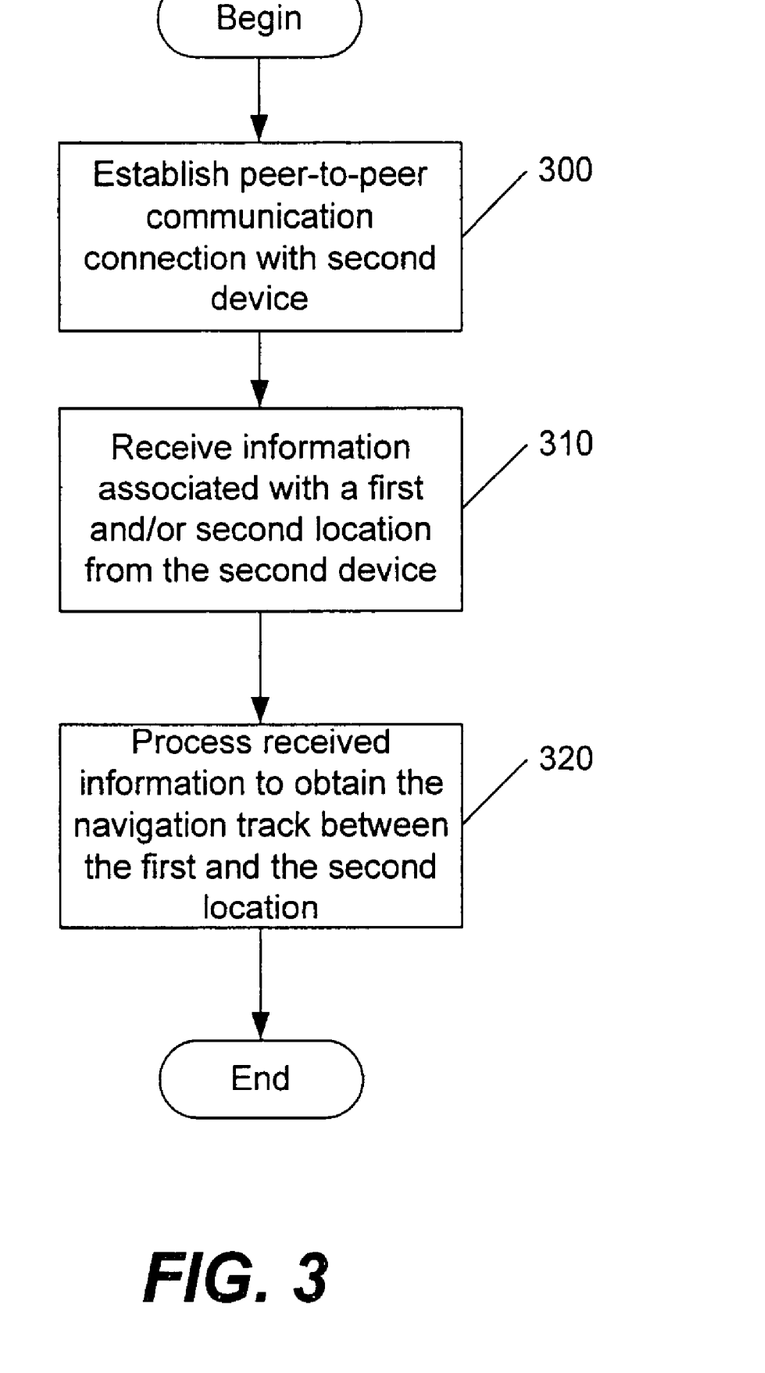
FIG. 3 is a flowchart that illustrates operations for obtaining a navigation track based on location information shared between peer devices in accordance with some embodiments of the present invention.

The flowchart/message flow diagrams of FIGS. 3 and 4 illustrate the architecture, functionality, and operations of embodiments of methods, devices, and/or computer program products for obtaining a navigation track based on location information shared between peer devices. In this regard, each block and/or message and associated communication represents a module, segment, or portion of code, which comprises one or more executable instructions for implementing the specified logical function(s). It should also be noted that in other implementations, the operation(s) noted in the blocks/messages may occur out of the order noted in FIGS. 3 and 4. For example, two blocks/messages shown in succession may, in fact, be communicated substantially concurrently or the blocks/messages may sometimes be communicated in the reverse order, depending on the functionality involved.

Some embodiments of the present invention may be illustrated by way of example. FIGS. 5-8 illustrate navigation tracks that are generated by a navigation module on a device based on location information received from another device via a peer-to-peer communication connection in accordance with various embodiments of the present invention.

Figure 5:
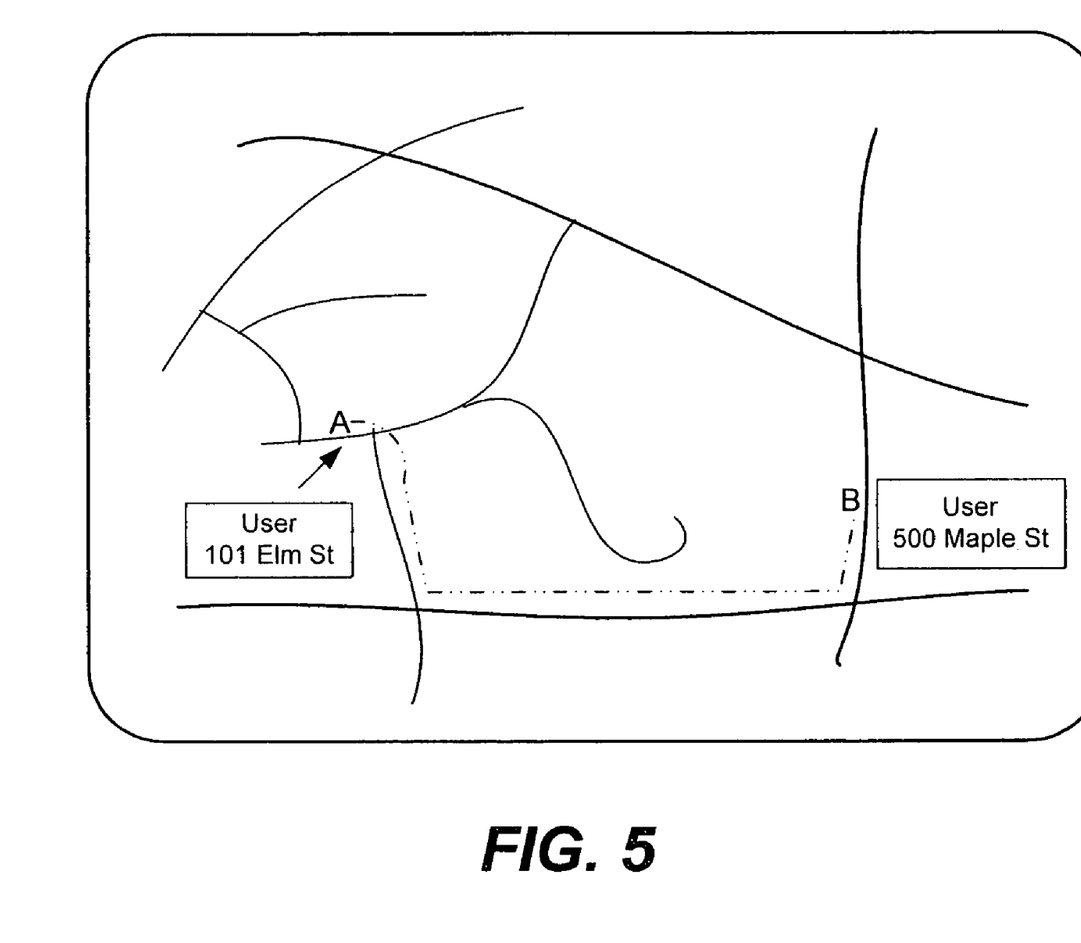
FIGS. 5-8 are electronic device displays that illustrate the presentation of a navigation track to a user of an electronic device in accordance with some embodiments of the present invention.
Figure 6:
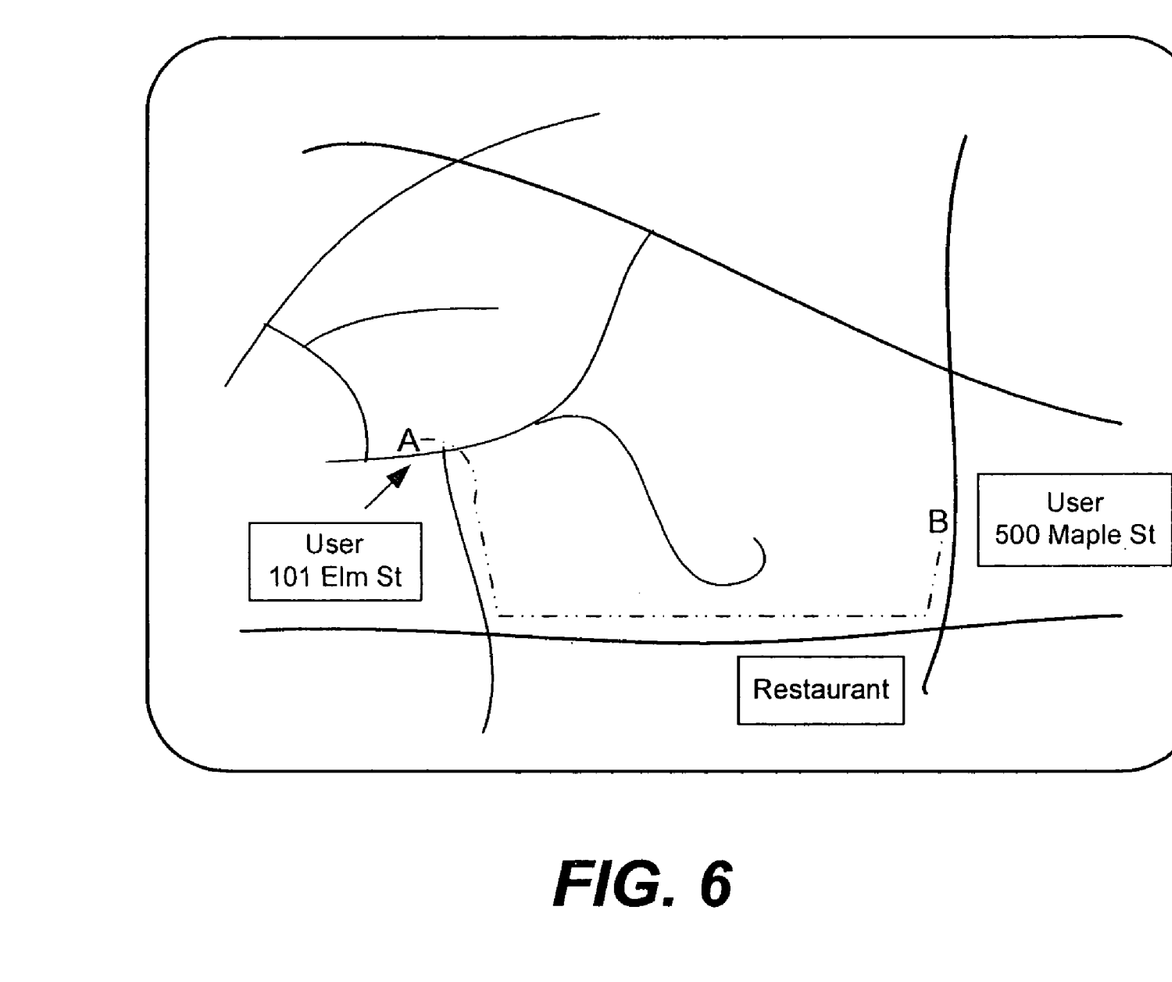

Referring to FIG. 5, this navigation track example is similar to the one described above with respect to FIG. 4. A user of a device at 101 Elm St. obtains an address of a friend from a location attachment included in an IM. The navigation module on the user's device that received the IM with the address processes the location information as described above to determine a navigation path from the user's current location (point A) to the friend's (500 Maple St.; point B). Referring now to FIG. 6, the location information for the friend's address or the navigation information/data available locally and/or remotely via a navigation information repository server may include one or more waypoints. Waypoints are sets of coordinates that identify a point in physical space. These coordinates may include longitude and latitude. Waypoints are often associated with distinctive features, such as rock formations, springs, oases, mountains, buildings, roadways, waterways, railways, and the like. As shown in FIG. 6, the navigation track includes a waypoint in the form of a restaurant. This may assist the user in finding his/her friend's address on Maple St. at point B as the restaurant is an indication that the user is approaching an intersection where a turn on to a new road is required.

Figure 7:
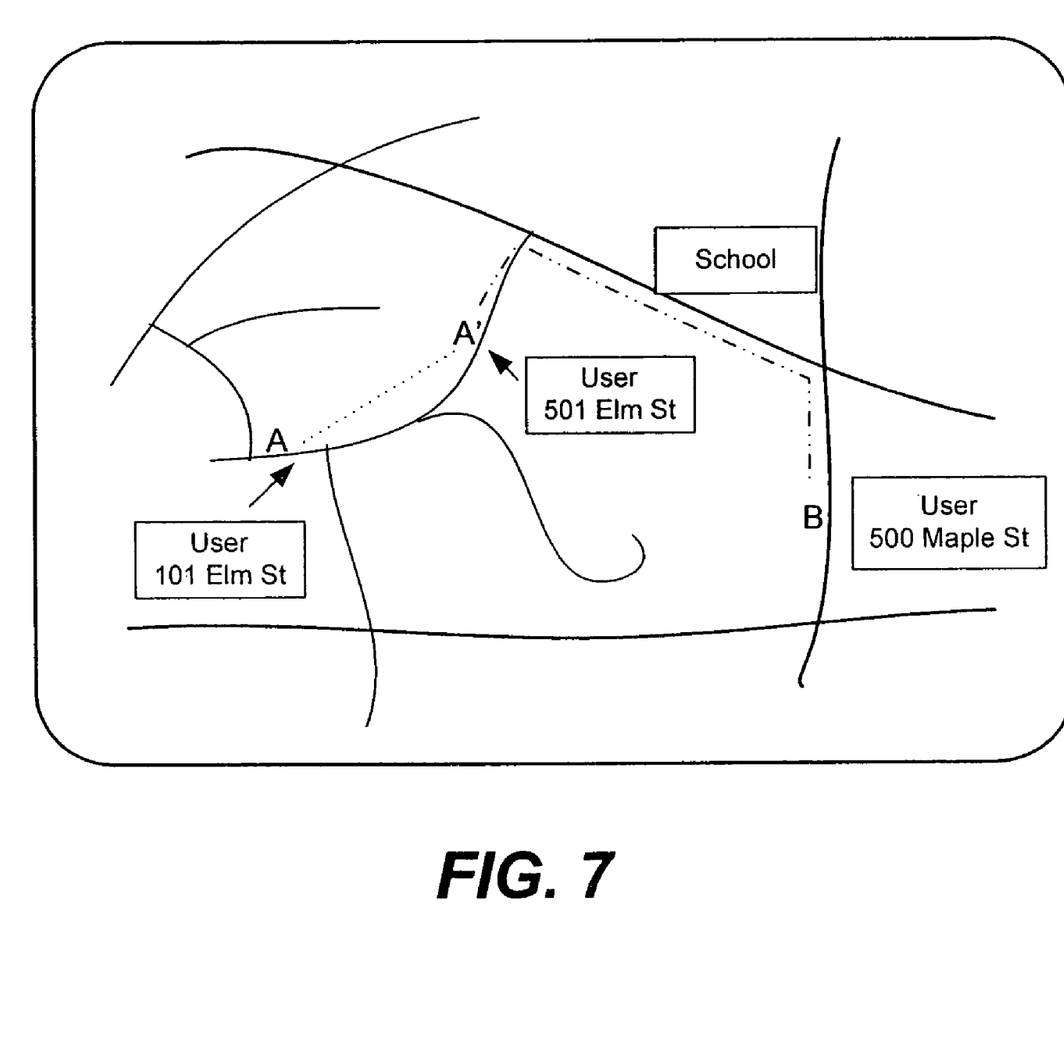

FIG. 7 illustrates a variation on the examples of FIGS. 5 and 6. In this example, the user of the first device proceeds to 501 Elm St. to pick up a friend to go to the friend's house at 500 Maple St. (point B). By changing locations, however, the original navigation path to 500 Maple St. is no longer the most desirable one. Accordingly, the navigation module on the user's device detects the change in location and determines a new navigation path from 501 Elm St. (point A') to the friend's house at 500 Maple St. A new waypoint corresponding to a school is also provided to alert the user that a turn is upcoming.

Figure 8:
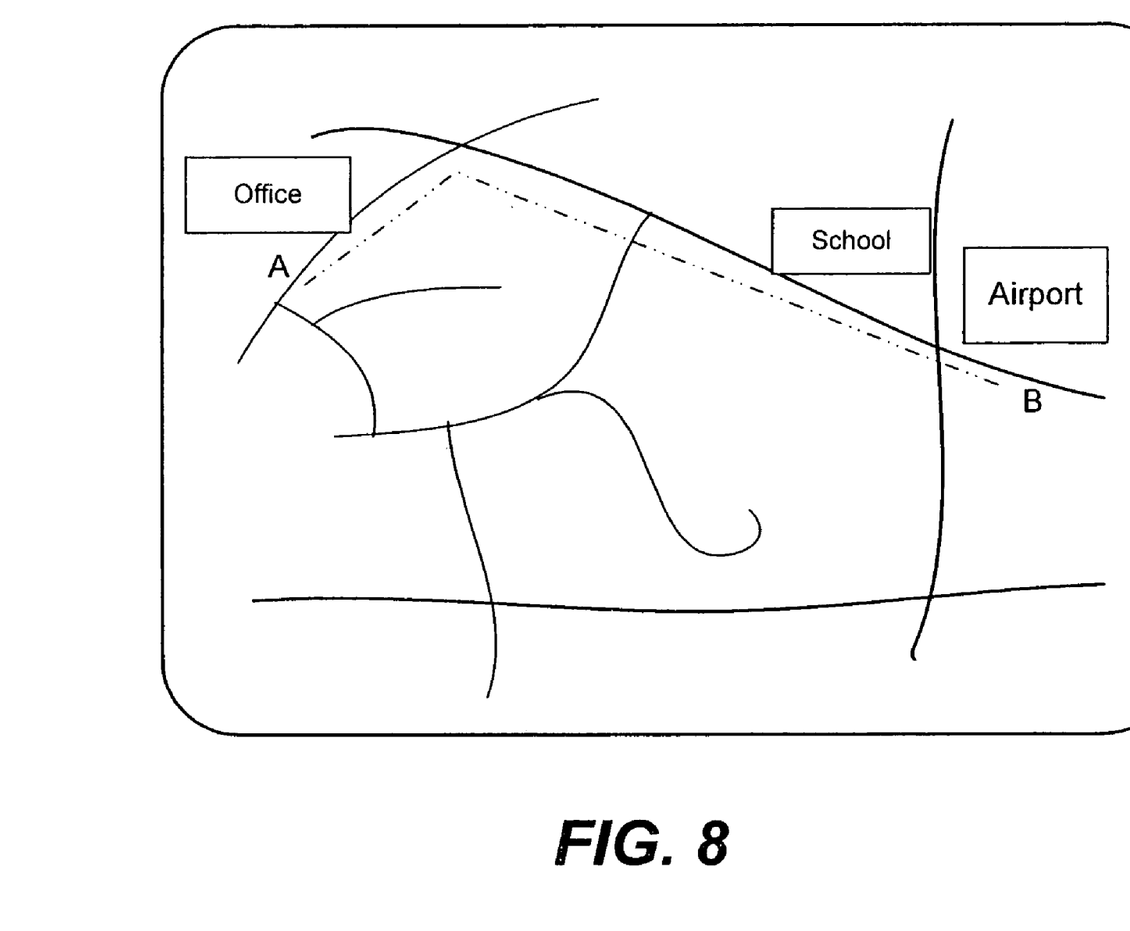

FIG. 8 illustrates an example in which the navigation path is between two locations not associated with the current location of the first device, i.e., the device that received a message containing location information. For example, a user may receive an email from a friend requesting that the user pick him/her up at the airport, which is identified by name in the email. The navigation module on the user's device extracts the airport name from the email and allows the user to save the location information in a local file. On the day of the trip, the user knows that he/she will be leaving from the office to pick up his/her friend. The user clicks on the location information file and provides the navigation module on the device with the address of his/her office, which triggers the navigation module on the device to process location information regarding the user's office and the airport and to generate a navigation track between the user's office (point A) and the airport (point B). A waypoint corresponding to a school is provided to alert the user that the airport is coming up soon.

Many variations and modifications can be made to the embodiments without substantially departing from the principles of the present invention. All such variations and modifications are intended to be included herein within the scope of the present invention, as set forth in the following claims.

That which is claimed:

1. A method of operating a first device to obtain a terrestrial navigation track between a first location and a second location, comprising:
    establishing a peer-to-peer communication connection with a second device;
    receiving a message that contains information associated with at least one of the first location and the second location from the second device, the information being associated with a navigation module on the first device; and
    processing the information associated with the at least one of the first location and the second location using the navigation module to obtain the terrestrial navigation track between the first location and the second location, the terrestrial navigation track comprising an identifiable thoroughfare.

2. The method of claim 1, further comprising:
    displaying the terrestrial navigation track.

3. The method of claim 1, wherein processing the information comprises:
    accessing a navigation information repository on the first device to determine the terrestrial navigation track between the first location and the second location.

4. The method of claim 1, wherein processing the information comprises:
    accessing a remote navigation information repository via a communication connection therewith to determine the terrestrial navigation track between the first location and the second location.

5. The method of claim 1, wherein the first location is a current location of the first device.

6. The method of claim 5, further comprising:
    updating the determined terrestrial navigation track responsive to changes in the current location of the first device.

7. The method of claim 1, wherein the first location is a current location of the second device.

8. The method of claim 7, wherein the second location is a current location of the first device.

9. The method of claim 1, wherein neither of the first location and second location is a current location of the first device.

10. The method of claim 1, wherein the information associated with at least one of the first location and the second location comprises at least one of global positioning system information, cellular technology location information, an address, and a name.

11. The method of claim 10, wherein the global positioning system information is encoded in a global positioning system eXchange format.

12. The method of claim 1, wherein the information associated with at least one of the first location and the second location comprises at least one waypoint between the first location and the second location; and
wherein the obtained terrestrial navigation track between the first location and the second location includes the at least one waypoint.

13. The method of claim 1, wherein the message comprises at least one of a short message service text message, a hyperlink, an electronic mail, a directory listing, an advertisement, an instant message, and a voice over Internet protocol call; and
wherein the information is at least one of an attachment to the message and embedded in the message using at least one delimiter that distinguishes the information from other content of the message.

14. The method of claim 1, further comprising, before processing the information:
saving the information at the first device; and
ending the communication connection with the second device.

15. A computer program product for operating a first device to obtain a terrestrial navigation track between a first location and a second location, comprising:
a non-transitory computer readable storage medium having computer executable program code embodied therein, the computer executable program code comprising:
computer readable program code configured to establish a peer-to-peer communication connection with a second device;
computer readable program code configured to receive a message that contains information associated with at least one of the first location and the second location from the second device, the information being associated with a navigation module on the first device; and
computer readable program code configured to process the information associated with the at least one of the first location and the second location using the navigation module to obtain the terrestrial navigation track between the first location and the second location, the terrestrial navigation track comprising an identifiable thoroughfare.

16. An electronic device, comprising:
a navigation module that is configured to process information associated with the at least one of a first location and a second location to obtain a terrestrial navigation track between the first location and the second location, the terrestrial navigation track comprising an identifiable thoroughfare; and
a communication module that is configured to establish a peer-to-peer communication connection with another electronic device and to receive a message that contains the information associated with at least one of the first location and the second location therefrom, the information being associated with the navigation module.

17. The device of claim 16, wherein the navigation module is further configured to access a navigation information repository on the electronic device to determine the terrestrial navigation track between the first location and the second location.

18. The device of claim 16 wherein the navigation module and communication module are further configured to access a remote navigation information repository via a communication connection therewith to determine the terrestrial navigation track between the first location and the second location.

19. The device of claim 16 wherein the information associated with at least one of the first location and the second location comprises at least one of global positioning system information, cellular technology location information, an address, and a name; and
wherein the information associated with at least one of the first location and the second location is at least one of an attachment to the message and embedded in the message using at least one delimiter that distinguishes the information from other content of the message.

20. The device of claim 16, wherein the information associated with at least one of the first location and the second location comprises at least one waypoint between the first location and the second location; and
wherein the obtained terrestrial navigation track between the first location and the second location includes the at least one waypoint.

* * * * *